United States Patent [19]

Bainbridge

[11] Patent Number: 5,167,430
[45] Date of Patent: Dec. 1, 1992

[54] AUTOMOTIVE EXHAUST SYSTEM DECOUPLER WITH RESILIENT SLEEVE

[75] Inventor: David W. Bainbridge, Littleton, Colo.

[73] Assignee: Manville Corporation, Denver, Colo.

[21] Appl. No.: 847,411

[22] Filed: Nov. 19, 1991

[51] Int. Cl.⁵ .............................................. F16L 59/00
[52] U.S. Cl. ..................................... 285/53; 285/49; 285/163; 285/235; 60/322; 181/222
[58] Field of Search ............... 285/45, 47, 49, 50, 285/53, 54, 163, 164, 165, 235, 237, 286, 330, 226; 181/222, 227, 228; 60/322

[56] References Cited

U.S. PATENT DOCUMENTS

| | | | |
|---|---|---|---|
| 2,937,036 | 8/1955 | Watkins | 285/53 |
| 3,420,553 | 2/1966 | Poxon et al. | 285/50 |
| 3,492,030 | 9/1968 | Harrison et al. | 285/300 |
| 3,549,176 | 12/1970 | Contreras | 285/286 |
| 3,574,358 | 4/1971 | Cassel | 285/53 |
| 3,840,256 | 8/1974 | Cox, Jr. | 285/286 |
| 3,864,909 | 2/1975 | Kern | 285/53 |
| 3,997,194 | 12/1976 | Eifer et al. | 285/53 |
| 4,363,504 | 12/1982 | DeFeo et al. | 285/47 |
| 4,427,220 | 1/1984 | Decker | 285/165 |
| 4,659,117 | 4/1987 | Holzhausen | 285/49 |

Primary Examiner—Randolph A. Reese
Assistant Examiner—Timothy Aberle
Attorney, Agent, or Firm—Cornelius P. Quinn

[57] ABSTRACT

A flexible coupling for connecting an engine manifold to an exhaust pipe to relieve torque. Concentrically spaced flexible tubes, which have insulation filling the annular space between them, are connected to inlet and outlet tubes having interior ends located between the ends of the flexible tubes. The inlet and outlet tubes have enlarged upstream ends and smaller downstream ends. By overlapping the ends of the inlet and outlet tubes, the tubes are able to have relative angular movement when the flexible tubes bend due to engine torque. One or more separate tubes which also have enlarged and smaller upstream and downstream ends may be provided to overlap with the inlet and outlet tubes to allow bending of longer couplings.

9 Claims, 3 Drawing Sheets 5,167,430

AUTOMOTIVE EXHAUST SYSTEM DECOUPLER WITH RESILIENT SLEEVE

This is a continuation of application Ser. No. 07/558,132, filed Jul. 26, 1990 now abandoned.

FIELD OF THE INVENTION

This invention relates to a coupling for connecting elements in an automotive exhaust system. More particularly, it relates to a flexible decoupler for connecting the engine manifold to an exhaust pipe section.

BACKGROUND OF THE INVENTION

In the operation of an automotive vehicle the engine creates torque during periods of acceleration and deceleration. For engines which are aligned so that the crankshaft extends along the length of the vehicle, conventional connections between the engine manifold and the exhaust system are able to absorb the torque without problems. For engines arranged along a transverse axis, however, the torque stresses the normally rigid connection between the engine manifold and the exhaust system, which can eventually cause fatigue cracking of the engine manifold.

To prevent the transmission of torque forces to the engine manifold, it is necessary to replace the normally rigid connection between the engine manifold and the exhaust system with one that does not transmit the torque forces. This typically has been accomplished through use of a ball and socket joint, which allows the angle between the manifold and the exhaust system to vary without transmitting undesirable stresses to the engine manifold. Although this arrangement has been successful in preventing fatigue cracking of the manifold, the joint is not able to contain the exhaust gases, allowing them to leak out into the atmosphere without passing through the catalytic converter. This creates the potential danger of leaked exhaust gases entering the passenger compartment of the vehicle.

Further drawbacks in conventional coupling arrangements are the lack of thermal insulation in the connection between the engine manifold and the exhaust system and the high cost of such connectors.

It would be desirable to be able to unload the engine manifold from exhaust system torque in a more reliable and efficient manner, and to do so at a more economical cost.

SUMMARY OF THE INVENTION

The invention comprises a flexible coupling which is capable, with respect to the transmission of torque forces, of decoupling the engine manifold and the exhaust pipe system in an automotive vehicle. The coupling comprises a flexible metal tube which has an inlet tube extending through one end and an outlet tube extending through the other end. The inlet and outlet tubes comprise portions of an exhaust gas flow path through the coupling and have interior ends located within the coupling. Means are provided for connecting the ends of the flexible metal tube to the inlet and outlet tubes. The interior ends of the inlet and outlet tubes are arranged so as to be capable of substantial angular movement relative to each other upon bending of the flexible metal tube. Thus, forces which tend to cause angular movement between the engine manifold and the exhaust system are taken up by the flexible coupling instead of being transmitted to the engine manifold.

The coupling may be insulated by insulating the exterior of the flexible metal tube and providing a second flexible metal tube to hold the insulation in place. The flexible tubes may be connected to the inlet and outlet tubes in the manner described in the more detailed description hereinafter so as to provide a gas-tight coupling which effectively prevents the escape of exhaust gas.

In a preferred arrangement, the inlet and outlet tubes have enlarged upstream portions, enabling the enlarged portion of the outlet tube to overlap either the downstream end of the inlet tube or the downstream end of an intermediate tube length of similar shape positioned within the inner flexible metal tube. This overlapping arrangement, while maintaining sufficient clearance between the inner flexible metal tube and the inlet and outlet tubes and any intermediate tube, permits the relative angular movement between the inlet and outlet tubes.

The above and other aspects of the invention, as well as other benefits, will readily be ascertained from the more detailed description of the preferred embodiments which follow.

DETAILED DESCRIPTION OF THE PREFERRED EMBODIMENTS

Figure 1:
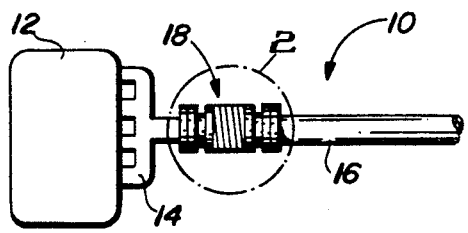
FIG. 1 is a schematic view of a portion of an automotive exhaust system incorporating the coupling of the present invention.

Referring to FIG. 1, the upstream portion of an automotive exhaust system 10 is schematically illustrated as comprising an engine 12 and an engine exhaust manifold 14 connected to exhaust pipe 16 by the coupling 18 of this invention.

Figure 2:
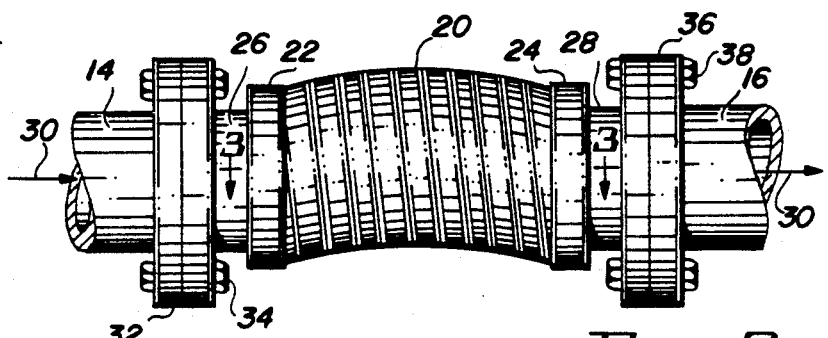
FIG. 2 is an enlarged side elevation of the portion of FIG. 1 enclosed within the circle 2.
Figure 3:
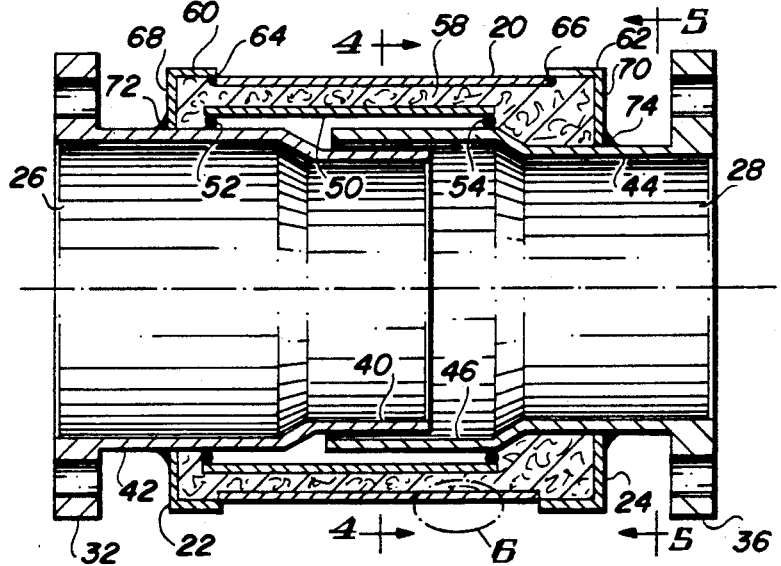
FIG. 3 is an enlarged longitudinal sectional view of the coupling taken along line 3—3 of FIG. 2.
Figure 4:
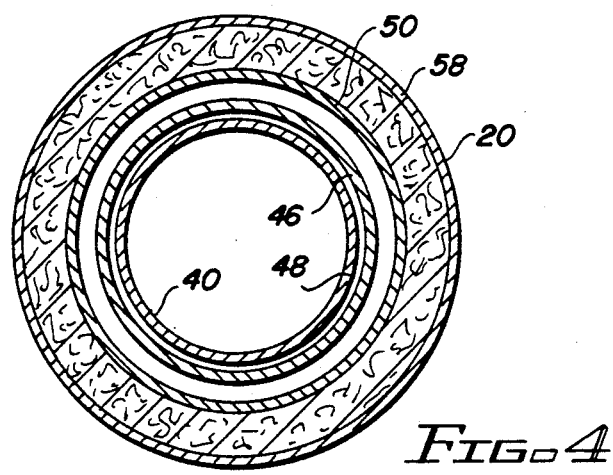
FIG. 4 is a transverse sectional view of the coupling taken along line 4—4 of FIG. 3.

As shown in FIG. 2, the coupling 18 comprises an outer flexible tube 20 connected to end caps 22 and 24. The upstream end cap 22 is connected to an inlet tube 26 while the downstream end cap 24 is connected to an outlet tube 28. The direction of flow of exhaust gases from the engine manifold is indicated by flow arrows 30. Although the inlet and outlet tubes may be connected to the exhaust system in any effective manner, for purposes of illustration the inlet tube 26 is shown as being connected to the engine manifold 14 by means of mounting flanges 32 and bolts 34, and the outlet tube 28 is shown as being connected to the exhaust pipe 16 by means of mounting flanges 36 and bolts 38. The coupling is shown in the flexed condition caused by torque forces generated during engine acceleration and deceleration. Referring to FIGS. 3 and 4, it can be seen that the inlet tube 26 comprises a downstream portion 40 of relatively small diameter and an upstream portion 42 of relatively large diameter. Similarly, the outlet tube 28 comprises a relatively small diameter downstream portion 44 of the same diameter as the inlet tube portion 40 and a relatively large diameter upstream portion 46 of the same diameter as the inlet tube portion 42. In practice, the inlet and outlet tubes preferably would be formed from lengths of exhaust pipe which have been enlarged at one end to form the shape illustrated. The enlarged portion may be formed by any suitable means, such as by swaging or by welding a larger diameter tube to a standard exhaust pipe section. However formed, the larger diameter portions should be upstream of the smaller diameter portions rather than in the reverse positions to prevent problems with back pressure and eddy currents in the exhaust gas flow.

The large diameter portion 46 of the outlet tube 28 overlaps the small diameter portion 40 of the inlet tube 26 over a substantial portion of their lengths. The inside diameter of the enlarged portion 46 is greater than the outside diameter of the smaller portion 40 by an amount which provides for an annular space 48 between the portions 40 and 46 for a reason to be explained later.

A flexible metal tube or hose 50 surrounds the inlet and outlet tubes 26 and 28 and is connected to them by suitable means to secure the flexible tube and the inlet and outlet tubes together as a unit. As illustrated in FIG. 3, a continuous weld 52 extending around the circumference of the inlet tube 26 connects the inlet tube to the upstream end of the flexible tube 50, while a continuous weld 54 extending around the circumference of the outlet tube 28 connects the outlet tube to the downstream end of the flexible tube. Because the flexible tube 50 should be radially spaced from the large diameter portion 46 of the outlet tube 28 situated between the extremities of the flexible tube, the welds 52 and 54 preferably engage the large diameter portions 42 and 46.

The outer flexible metal tube or hose 20 surrounds and is radially spaced from the first flexible tube 50 so as to provide an annular space for receiving a layer of insulation 58. The insulation may be of any type that will provide adequate insulating properties for the coupling, that is, being able to withstand exhaust gas temperatures in the range of 1600° F. to 1800° F. Although other insulating materials are capable of withstanding temperatures up to 1600° F., refractory fiber insulation is the most practical choice from the standpoint of resistance to temperatures exceeding 1600° F. and from the standpoints of insulating ability, cost and weight. Its low density of 4 pcf to 16 pcf permits it to be wrapped around the inner flexible metal tube without damage and to compress as necessary during transmission of torque.

Figure 5:
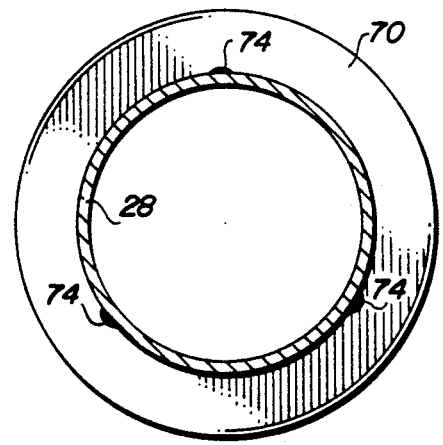
FIG. 5 is a transverse sectional view of the coupling taken along line 5—5 of FIG. 3.

The outer flexible tube 20 is attached to the cylindrical legs 60 and 62 of the end caps 22 and 24 by continuous welds 64 and 66, which provide a seal to the insulation 58. The shoulder portions 68 and 70 of the caps 22 and 24 are attached to the inlet and outlet tubes by spot welds 72 and 74. This arrangement is shown also in FIG. 5, which is an end view of the downstream end of the coupling and shows the spaced spot welds 74. It will be understood that the spot welds 72 at the upstream end would be similarly arranged. The use of spot welds at these locations instead of continuous welds limits heat transfer by conduction and also provides a path for the escape of water vapor which may have condensed within the confines of the spaced flexible tubes. By maintaining tight tolerances between the end caps and the inlet and outlet tubes, moisture in the form of road splash will be prevented from gaining access to the insulation.

Figure 6:
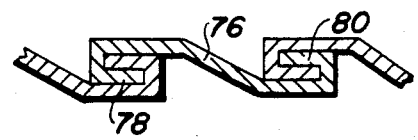
FIG. 6 is an enlarged transverse sectional view of the corrugated strip enclosed in the circle 6 in FIG. 3.
Figure 7:
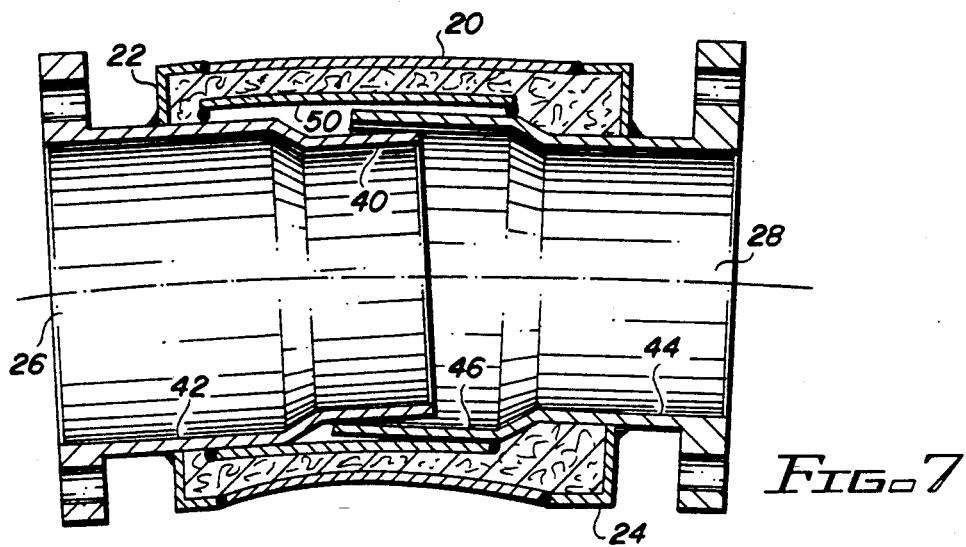
FIG. 7 is a longitudinal sectional view similar to that of FIG. 3, but showing the coupling in flexed condition.

The flexible tubes 50 and 20 may be of any suitable construction which permits flexing. Preferably, since the flexible tubes are formed of metal in order to resist the temperatures to which they are exposed and to provide adequate strength, they are of corrugated construction, as shown in FIG. 3. Corrugated tubes are typically formed by winding a continuous corrugated strip around a forming mandrel at an angle to the mandrel and attaching the edge of the strip to the edge of the strip in the next convolution. The edges of the strips are typically formed to initially loosely fit into or engage with each other, after which a forming roller compresses the edge configuration to clamp the edges together to form a continuous interlocking gas-tight seam. Thus, as shown in FIG. 6, the edges of the strip 76 are bent in upon themselves at 78 and 80 to form recesses or pockets in which similar shaped edges of adjacent strips fit. The resulting tube is able to bend or flex without destroying its gas-tight construction. Although flexible metal tubes of this same general configuration are readily available, it will be understood that other tube designs capable of providing a similar function may be employed if desired. When the coupling of FIG. 3 is subjected to stresses tending to flex or bend it, the flexible tubes 20 and 50 will flex accordingly as illustrated in FIG. 7. The arrangement of FIG. 3, whereby the large diameter portion 46 of the outlet tube is spaced from both the inner flexible tube 50 and the overlapped small diameter portion 40 of the inlet tube, allows the flexible tubes to bend even though the inner flexible tube 50 is connected to the rigid inlet and outlet tubes. Thus as shown in FIG. 7, enough space has been provided for the outlet tube 28 to become angled with respect to the inlet tube 26. Note that the lengths of the overlapping portions 40 and 46 are sufficient to provide a barrier to the flexible tubes against direct impingement of exhaust gases. Without this barrier the flexible tubes would not be able to withstand the hostile exhaust gas environment and would ultimately fail. During such flexing movement of the coupling, the insulation between the flexible tubes will be compressed to a degree at the inside radius of the bend and will be subjected to tension at the outside radius of the bend. The preferred insulation, being fibrous, is quite capable of accommodating this type of movement.

Figure 8:
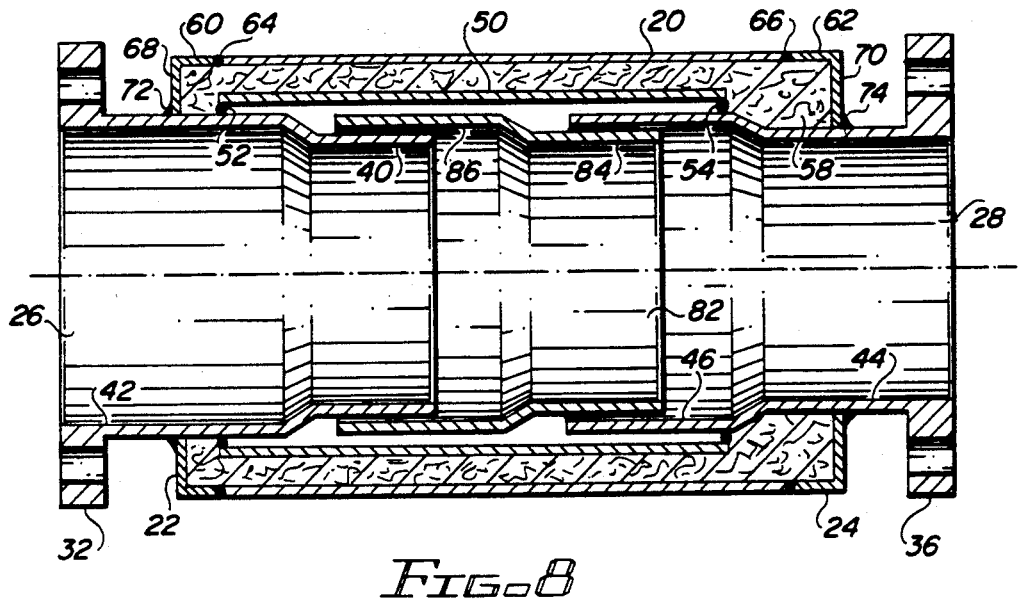
FIG. 8 is a partial longitudinal sectional view similar to that of FIG. 3, but showing a modified arrangement.
Figure 9:
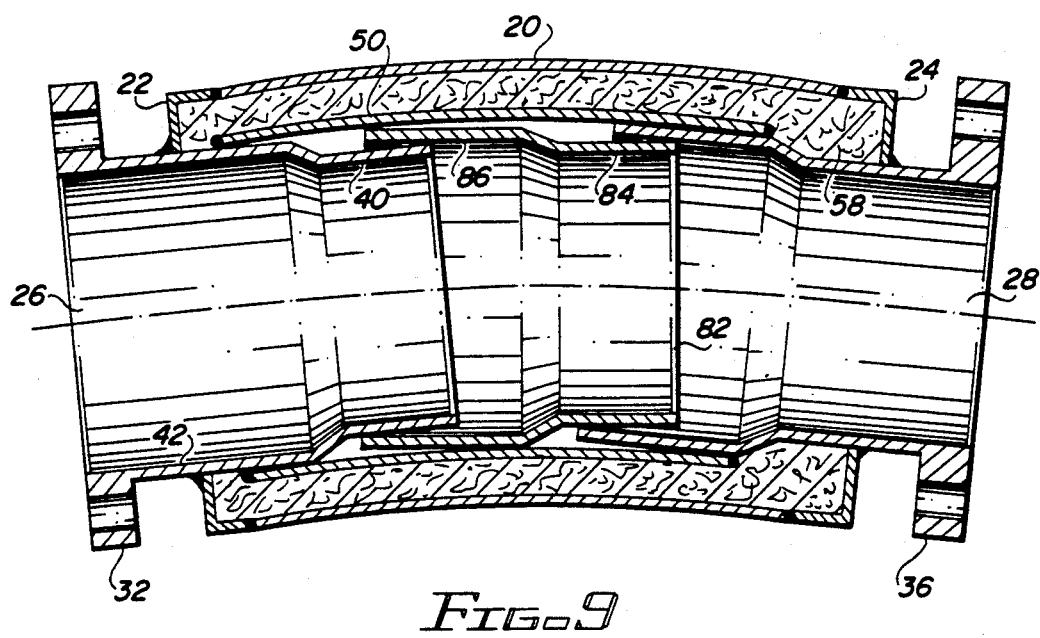
FIG. 9 is a longitudinal sectional view similar to that of FIG. 8, but showing the coupling in flexed condition.

The arrangement of FIG. 3 is suitable for relatively short couplings which provide enough space for the overlapping inlet and outlet tubes to have sufficient relative angular movement. If, however, the flex requirements of the coupling are severe or the coupling cannot accommodate long overlapping lengths of tubing, the arrangement of FIG. 8 is preferred. In this modification the basic elements are the same and bear the same reference numerals as in FIG. 3, but an intermediate tube 82 has been added between the inlet and outlet tubes. The intermediate tube 82 is comprised of a relatively small diameter portion 84 and a relatively large diameter portion 86 of the same diameters as those of the inlet and outlet tubes. The large diameter portion 46 of the outlet tube overlaps the small diameter portion 84 of the intermediate tube, while the large diameter portion 86 of the intermediate tube overlaps the small diameter portion 40 of the inlet tube. By maintaining an annular space between the overlapping portions of the intermediate tube and the inlet and outlet tubes, and between the intermediate tube and the inner flexible tube in the same manner as in the first embodiment, and further by making the overlapping portions of the tubes sufficiently long, the inlet, outlet and intermediate tubes are able to angularly move relative to each other upon flexing of the coupling. This is further illustrated in FIG. 9, wherein the floating arrangement of the intermediate tube within the coupling which enables such angular movement is illustrated.

Figure 10:
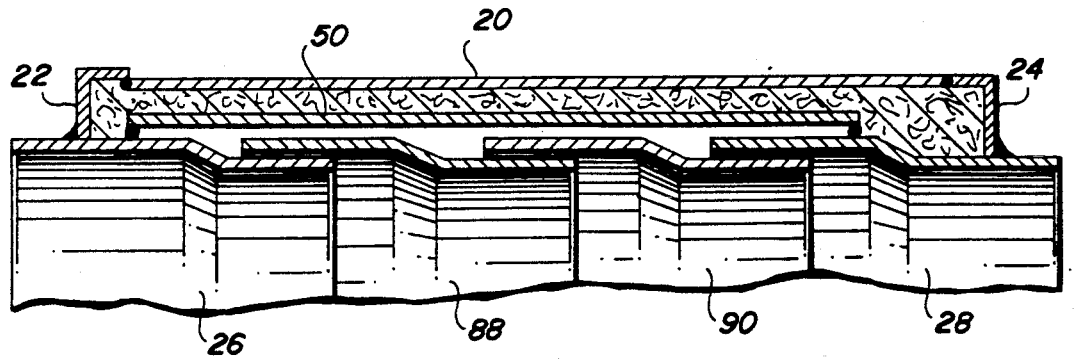
FIG. 10 is a partial longitudinal sectional view similar to that of FIG. 8, but showing another modified arrangement.

It is possible to lengthen the coupling or maximize the flexing even more by providing additional intermediate tubes. The arrangement of FIG. 10 illustrates such a modification wherein two intermediate tubes 88 and 90 are positioned between the inlet and outlet tubes 26 and 28. Both intermediate tubes have a floating arrangement whereby they are not connected to any of the elements in the coupling other than by being in overlapping engagement with each other and with the inlet and outlet tubes. The overlapped tubes will angularly move somewhat in the fashion of vertebrae to permit the flexible tubes to flex in response to stresses induced by engine torque.

It will be appreciated that there are no set dimensions that must be adhered to since the individual requirements of specific installations will cause them to vary. The diameters of the tubes and the clearance between overlapped portions must be sufficient, however, to permit the necessary flexure while maintaining the overlapped portions of a length sufficient to prevent direct impingement of exhaust gases on the inner flexible tube. The flexure requirements will vary between types of vehicles. The maximum flex angle requirement found to date has been in the order of 14°.

It is preferred that the inlet, outlet and intermediate tubes be formed from ordinary exhaust pipe tubing. By way of example, the small diameter portions of the tubes utilized in one embodiment were 2 inches in outside diameter and the large diameter portions were 2 1/16 inches in inside diameter, leaving a gap of 1/32 inch between the overlapped portions. In addition, the large diameter portions were spaced from the inner flexible tube by about 1/8 inch, and the length of the overlapped portions of the tubes was about 3/8 inch.

It will now be appreciated that the coupling of the invention provides an economical means of decoupling an automotive exhaust system from the engine manifold in terms of the transmission of stresses and vibration from engine torque. In addition, the decoupler of the invention also allows for expansion and compression of the exhaust system, thereby decoupling the engine on a three dimensional axis. Further, because of its unique design, the decoupler also isolates engine vibrations from the exhaust system, acting as a noise and vibration dampener.

The coupling is simple in construction, with the inlet and outlet tubes being held together by their connection to the inner flexible tube. The continuous weld employed for this connection makes the coupling gas-tight, preventing the escape of exhaust gases. The coupling also lends itself to being insulated by enabling the inner flexible tube to be surrounded with insulation.

It will be apparent that the invention is not necessarily limited to all the specific features described in connection with the preferred embodiments, but that changes to certain features which do not alter the overall function and concept of the invention may be made without departing from the spirit and scope of the invention, as defined in the appended claims.

What is claimed is:

1. A flexible coupling for connecting an engine manifold and an exhaust pipe in an internal combustion exhaust system, comprising:

a flexible metal tube capable of flexing transversely of its longitudinal axis;

an inlet tube extending through one end of the flexible metal tube, the inlet tube having a relatively wide upstream end and a relatively narrow downstream end, the relatively narrow downstream end being located within the flexible metal tube;

an outlet tube extending through the other end of the flexible metal tube, the outlet tube having a relatively wide upstream end and a relatively narrow downstream end, the relatively wide upstream end being located within the flexible metal tube and surrounding the relatively narrow downstream end of the inlet tube;

the inlet and outlet tubes having continuous walls devoid of openings and comprising portions of an exhaust gas flow path through the coupling;

means for connecting the flexible metal tube to the inlet and outlet tubes to form a sealed annular space defined by the flexible metal tube, the connecting means and the portions of the inlet and outlet tubes located within the flexible metal tube;

the downstream end of the inlet tube being spaced from the surrounding upstream end of the outlet tube to permit relative angular movement thereof upon bending of the flexible metal tube to thereby permit relative angular movement of the inlet and outlet tubes;

a layer of thermal insulation surrounding the flexible metal tube; and means for maintaining the insulation layer in place.

2. The flexible coupling of claim 1, wherein the means for maintaining the insulation layer in place comprises a second flexible metal tube surrounding the layer of insulation and means for securing the second flexible tube to the inlet and outlet tubes, and wherein the means for connecting the first flexible metal tube to the inlet and outlet tubes comprises continuous welds extending entirely around the periphery of the inlet and outlet tubes, the welds forming a gas-tight seal.

3. The flexible coupling of claim 2, wherein the means for securing the second flexible tube to the inlet and outlet tubes comprises an end cap connected to each end portion of the second flexible tube, one end cap being connected to the inlet tube and the other end cap being connected to the outlet tube.

4. The flexible coupling of claim 3, wherein each end cap is connected to the second flexible tube by a continuous weld extending entirely around the periphery of the end cap.

5. The flexible coupling of claim 4, wherein the end caps are connected to the inlet tube and the outlet tube by spaced spot welds.

6. A flexible coupling for connecting an engine manifold and an exhaust pipe in an internal combustion exhaust system, comprising:

a flexible metal tube capable of flexing transversely of its longitudinal axis;

an inlet tube extending through one end of the flexible metal tube, the inlet tube having a relatively wide upstream end and a relatively narrow downstream end, the relatively narrow downstream end being located within the flexible metal tube;

an outlet tube extending through the other end of the flexible metal tube, the outlet tube having a relatively wide upstream end and a relatively narrow downstream end, the relatively wide upstream end being located within the flexible metal tube;

an additional tube extending between the inlet and outlet tubes, the additional tube having a relatively wide upstream end and a relatively narrow downstream end, the relatively wide upstream end of the additional tube surrounding the relatively narrow downstream end of the inlet tube and the relatively wide upstream end of the outlet tube surrounding the relatively narrow downstream end of the additional tube;

the inlet, outlet and additional tubes having continuous walls devoid of openings and comprising portions of an exhaust gas flow path through the coupling;

means for connecting the flexible metal tube to the inlet and outlet tubes to form a sealed annular space defined by the flexible metal tube, the connecting means and the portions of the inlet and outlet tubes located within the flexible metal tube;

the downstream ends of the inlet tube and the additional tube being spaced from the respective surrounding upstream ends of the additional tube and the outlet tube to permit relative angular movement thereof upon bending of the flexible metal tube to thereby permit relative angular movement of the inlet and outlet tubes;

a layer of thermal insulation surrounding the flexible metal tube; and means for maintaining the insulation layer in place.

7. The flexible coupling of claim 6, wherein the means for maintaining the insulation layer in place comprises a second flexible metal tube surrounding the layer of insulation and means for securing the second flexible tube to the inlet and outlet tubes, and wherein the means for connecting the first flexible metal tube to the inlet and outlet tubes comprises continuous welds extending entirely around the periphery of the inlet and outlet tubes, the welds forming a gas-tight seal.

8. A flexible coupling for connecting an engine manifold and an exhaust pipe in an internal combustion exhaust system, comprising:

a flexible metal tube capable of flexing transversely of its longitudinal axis;

an inlet tube extending through one end of the flexible metal tube, the inlet tube having a relatively wide upstream end and a relatively narrow downstream end, the relatively narrow downstream end being located within the flexible metal tube;

an outlet tube extending through the other end of the flexible metal tube, the outlet tube having a relatively wide upstream end and a relatively narrow downstream end, the relatively wide upstream end being located within the flexible metal tube;

a plurality of additional tubes extending between the inlet and outlet tubes, each additional tube having a relatively wide upstream end and a relatively narrow downstream end, the addition tubes being arranged so that an upstream end thereof which is adjacent a downstream end thereof surrounds said adjacent downstream end;

the relatively wide upstream end of the additional tube positioned farthest upstream surrounding the relatively narrow downstream end of the inlet tube and the relatively wide upstream end of the outlet tube surrounding the relatively narrow downstream end of the additional tube positioned farthest downstream;

the inlet, outlet and additional tubes having continuous walls devoid of openings and comprising portions of an exhaust gas flow path through the coupling;

means for connecting the flexible metal tube to the inlet and outlet tubes to form a sealed annular space defined by the flexible metal tube, the connecting means and the portions of the inlet and outlet tubes located within the flexible metal tube;

the downstream ends of the inlet tube and the additional tubes being spaced from the respective surrounding upstream ends of the additional tubes and the outlet tube to permit relative angular movement thereof upon bending of the flexible metal tube to thereby permit relative angular movement of the inlet and outlet tubes;

a layer of thermal insulation surrounding the flexible metal tube; and means for maintaining the insulation layer in place.

9. The flexible coupling of claim 8, wherein the means for maintaining the insulation layer in place comprises a second flexible metal tube surrounding the layer of insulation and means for securing the second flexible tube to the inlet and outlet tubes, and wherein the means for connecting the first flexible metal tube to the inlet and outlet tubes comprises continuous welds extending entirely around the periphery of the inlet and outlet tubes, the welds forming a gas-tight seal.

* * * * *